Nov. 4, 1924.

V. LANCIA

BRAKE GEAR

Filed Aug. 28, 1923    2 Sheets-Sheet 1

1,514,054

Inventor
V. Lancia
by Langner, Parry, Card & Langner
Attys.

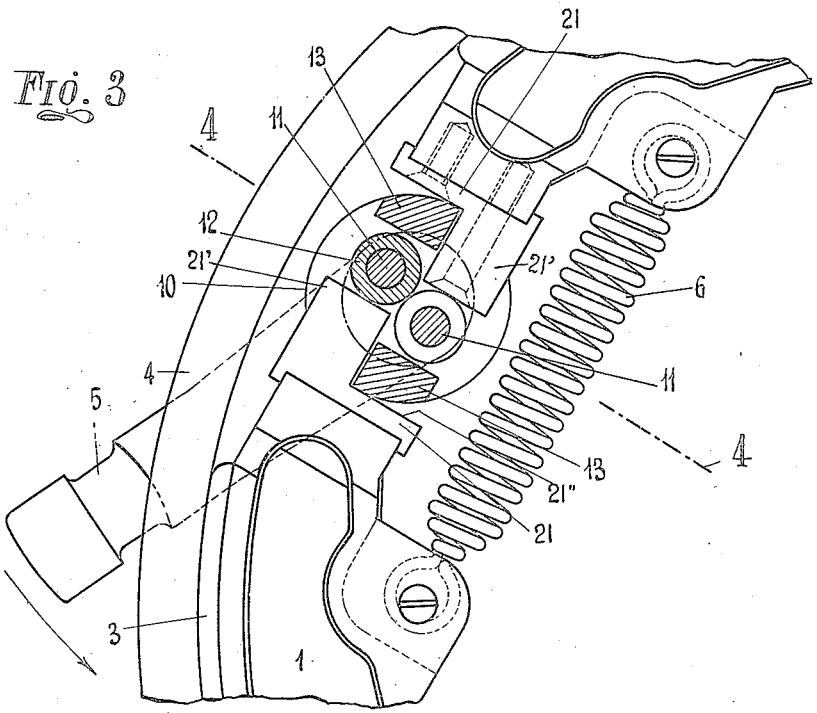
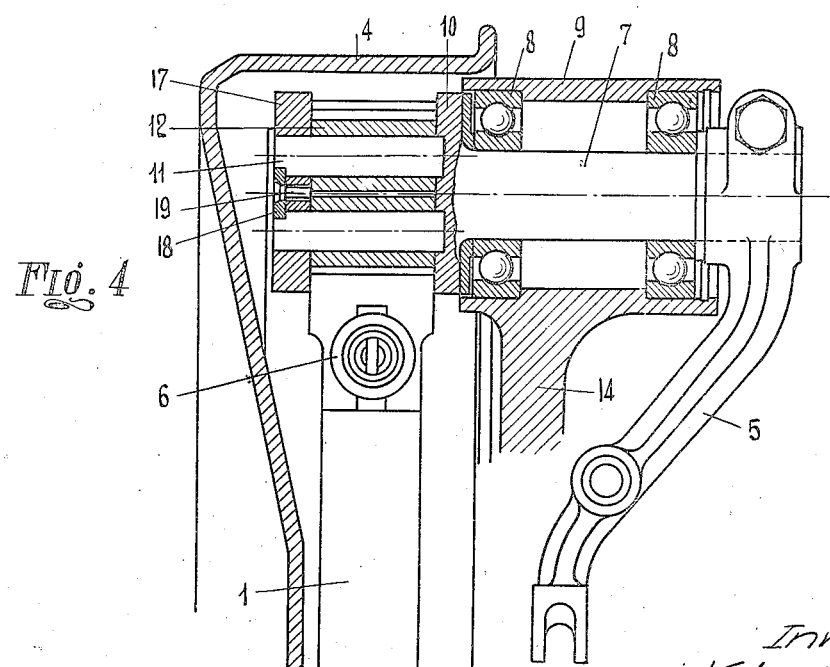

Patented Nov. 4, 1924.

1,514,054

UNITED STATES PATENT OFFICE.

VINCENZO LANCIA, OF TURIN, ITALY.

BRAKE GEAR.

Application filed August 28, 1923. Serial No. 659,844.

*To all whom it may concern:*

Be it known that I, VINCENZO LANCIA, a subject of the King of Italy, residing at Turin, Italy, have invented certain new and useful Improvements in Brake Gears, of which the following is a specification.

The present invention relates to brake gears of the class in which brake shoes are carried by rocking arms which are moved against a brake drum by means of a member acting on the ends of said arms to shift them away from each other.

The present invention has for its object a gear of said class in which the shoe arm operating member comprises a part mounted to rotate, and acting by antifriction means, on projecting pieces located at the free ends of the arms at the two sides of the travel path of a central point in said free ends, the sides of said projecting pieces resting on abutments of said rotatable part in the brake released position.

On the annexed drawing is shown by way of example an embodiment of the present invention, and:

Figure 3 is a fragmentary view to a larger scale showing the shoe arm operating member; and Figure 4 is a fragmentary section on line 4—4 of Figure 3.

Figure 1:
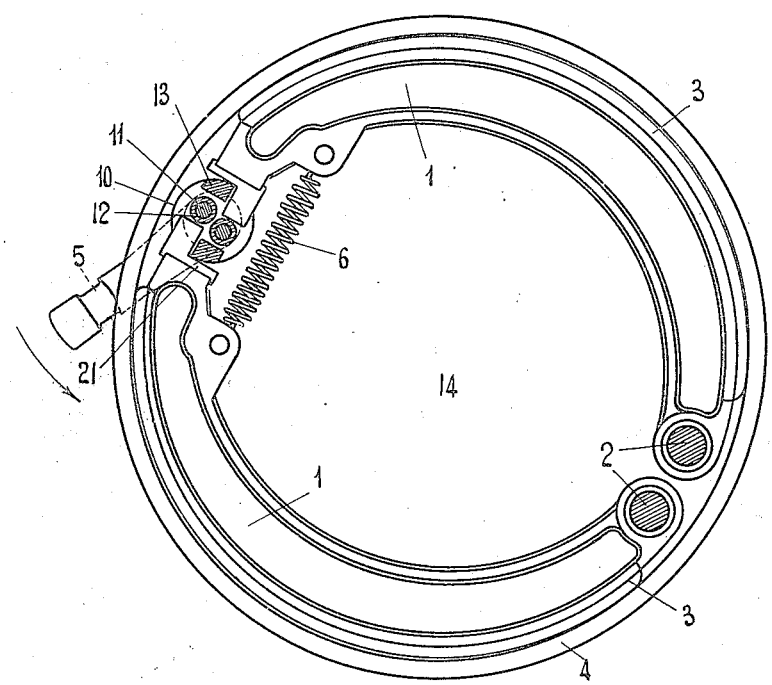
Figure 1 is a side view, with parts in section, of a brake gear according to the invention.
Figure 2:
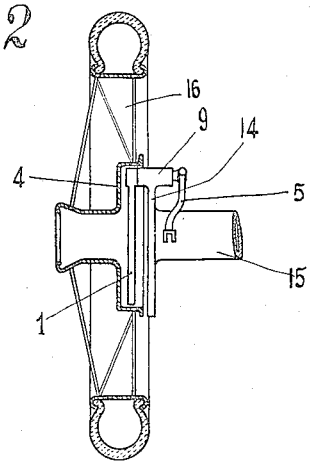
Figure 2 is a side view of the same with associate axle and wheel.

As illustrated on the drawing, the gear comprises a support 14 solid with the axle 15 of the wheel 16, and arms 1 pivoted on studs 2 carried by said support 14; said arms 1 are provided with brake shoes 3 intended to engage the brake drum 4 solid with the wheel 16 and are interconnected by a spring 6 which acts to resiliently hold them in a position with their shoes 3 spaced apart from said drum 4.

The ends of said arms 1 opposed to their pivoted ends are provided with parts 21 hereinafter described which cooperate with a member hereinafter described and manipulated by means of a lever 5 to shift said arms with their shoes 3 against the drum 4.

As shown by Figures 3 and 4, said operating member comprises a spindle 7 pivoted in a sleeve 9 of said support 14 by means of ball bearings 8 and carrying a head 10 located between the free ends of arms 1. This head 10 has longitudinal extensions 13 carrying a flange 17 and studs 11 are engaged in seats provided in said head 10 and flange 17 by means of a washer 18 in the flange 17.

On studs 11 and between head 10 and flange 17 are rotatable sleeves 12 intended to bear on end pieces 21 of arms 1.

As shown, the centres of studs 11 are arranged on a diameter of the head 10 substantially transverse to the path of travel of parts 21 and spindle 7 and the arm and pieces 21 provide a projecting portion 21' on which bears the associate sleeve 12 and a recessed portion 21" accommodating for parts 13.

When the operating lever 5 is released, the gear is in the position shown in the drawing, the parts 13 of the operating member 7—10 abutting against the adjacent side of arm end parts 21' under the action of spring 6, arms 1 and parts 21' on sleeves 12 carried by said rotatable member 7—10.

To apply the brake, the lever 5 is operated in the direction of the arrow (Figures 1 and 3) this operation causing the sleeves 12 to act on the end projections 21' and move the arm end pieces 21 and arm 1 away from each other; the brake shoes 3 carried by said arms 1 are thus applied against drum 4.

On the lever 5 being released, the parts are carried again in the position of Figures 1 and 3 by the action of spring 6.

In the described gear the action of the operating member 7—10 is completely transmitted to the shoe arms 1 by means of the end pieces 21' bearing on the sleeves 12, and the gear is stopped in released position by the cooperation of parts 13 and 21' without requiring further members.

It is to be understood that the present invention is not restricted to the described embodiment and it includes all the modifications thereof lying within the scope and spirit of the appended claims.

What I claim as my invention and desire to secure by United States Letters Patent is:

1. A brake gear comprising a brake drum, a support, arms having one end pivoted on said support, brake shoes on said arms, means for holding said arms and shoes released from said drum, a projecting piece at the free end of each arm, said pieces being located at the two sides of the travel path of a central point in said free ends, and an operating member for said arms, this member comprising a part rotatable in said support and extending between the projecting pieces of said arms, pivoted means on said part at opposite sides of its centre along a diameter of the same substantially transverse to the path of travel of said arm free ends, said pivoted means engaging the front ends of said projecting pieces to force said arms with their shoes against said drum, and abutments on said rotatable part bearing against a side of said projecting pieces in the brake released position.

2. A brake gear comprising a brake drum, a support, arms having one end pivoted on said support, brake shoes on said arms, means for holding said arms and shoes released from said drum, a projecting piece at the free end of each arm, said pieces being located on the two sides of the travel path of a central point in said free ends, and an operating member for said arms, this member comprising a spindle rotatable in said support, heads embracing the free ends of said arms and solid with the spindle, parts interconnecting said heads, studs fastened in said heads and rollers rotatable on said studs, the said studs being located in said heads at opposite sides of the center of said spindle and along a diameter substantially transverse to the travel path of said arm free ends, these rollers engaging the front ends of said projecting pieces to force said arms with their shoes against said drum, the parts interconnecting said heads abutting against a side of said projecting pieces in the brake released position.

3. A brake gear comprising a brake drum, a support, arms having one end pivoted on said support, brake shoes on said arms, means for holding said arms and brake shoes released from said drum, a projecting piece at the free end of each arm, said pieces being located on the two sides of the travel path of a central point in said free ends, an operating member for said arms comprising a spindle rotatable on said support between the said projecting pieces, a head solid with said spindle, longitudinally extending parts solid with said head, a second head carried by the last named parts and spaced from the first named one, and pivoted members mounted between said heads at the opposite sides of the centre of said spindle and along a diameter substantially transverse to the travel path of said projecting pieces, said pivoted members engaging the front of these projecting pieces to force said arms with their shoes against said drum, and said head interconnecting parts engaging the sides of said projecting parts in the brake released position.

In testimony whereof I have signed my name to this specification.

VINCENZO LANCIA.